US 6,735,015 B1

(12) United States Patent
Blackham (10) Patent No.: US 6,735,015 B1
(45) Date of Patent: May 11, 2004

(54) DISPLAY APPARATUS (75) Inventor: Geoffrey Howard Blackham, Hassocks (GB)

(73) Assignee: SEOS Limited, West Sussex (GB)

( * ) Notice: Subject to any disclaimer, the term of this patent is extended or adjusted under 35 U.S.C. 154(b) by 0 days.

(21) Appl. No.: 09/592,898

(22) Filed: Jun. 13, 2000

(30) Foreign Application Priority Data

Jun. 14, 1999 (GB) .............................................. 9913769

(51) Int. Cl.⁷ ...................... G03B 21/56; G03B 21/00; G03B 21/14; H04N 9/47; G09B 9/08
(52) U.S. Cl. ...................... 359/451; 359/443; 359/449; 348/121; 353/13; 353/79; 353/94; 353/98; 353/99; 434/40; 434/43; 434/44
(58) Field of Search .................. 345/121, 123, 345/741, 753; 359/451, 443, 449; 353/98, 99, 13, 79, 94; 434/40, 44, 43

(56) References Cited

U.S. PATENT DOCUMENTS

| 3,190,171 | A | * | 6/1965 | Reed | 359/366 |
|---|---|---|---|---|---|
| 4,348,187 | A | * | 9/1982 | Dotsko | 434/44 |
| 4,656,521 | A | | 4/1987 | Trzeciak et al. | 348/744 |
| 4,657,512 | A | * | 4/1987 | Mecklenborg | 434/44 |
| 5,242,306 | A | * | 9/1993 | Fisher | 434/44 |
| 5,253,116 | A | * | 10/1993 | Lacroix | 359/858 |
| 5,547,382 | A | * | 8/1996 | Yamasaki et al. | 434/61 |
| 5,748,264 | A | * | 5/1998 | Hegg | 348/746 |
| 5,833,340 | A | * | 11/1998 | Yoshikawa et al. | 353/98 |
| 5,890,788 | A | | 4/1999 | Chen et al. | 353/98 |
| 6,003,995 | A | * | 12/1999 | Dugdale et al. | 353/98 |
| 6,042,238 | A | * | 3/2000 | Blackham | 353/94 |

FOREIGN PATENT DOCUMENTS

| GB | 2 317 297 A | * | 3/1998 | H04N/5/74 |
|---|---|---|---|---|
| WO | WO 91/04508 | | 4/1991 | |
| WO | WO 98/10322 | | 3/1998 | |

* cited by examiner

Primary Examiner—Russell Adams
Assistant Examiner—Magda Cruz
(74) Attorney, Agent, or Firm—Iandiorio & Teska (57) ABSTRACT

Display apparatus (50) comprising a front projection screen (60), at least one projector (54) which is for providing a display on the screen (60) and which is positioned outside an enclosed display volume, the screen (60) being optimised to preferentially set the image distance in different regions when viewed by an observer (58) via a collimating mirror (62).

11 Claims, 7 Drawing Sheets

Cut-Away Perspective

Figure 1: Sample front-projected SEOS PRODAS display for a Sports Utility Vehicle Figure 2: Field of view occlusion from vehicle cab.

Figure 3: Dotted lines indicate extents of truck - More shadowing !!!!

Figure 4: Rear-projected display for a truck simulator.

Figure 5: Rear-projection screen gain effect.

Figure 6: Luminance uniformity of rear-projected image

Figure 7: Tilted Mirror Collimation Flight Simulator Display

Figure 8: Comprehensive Automobile Research and Development Simulator system

Figure 9: Front-projected PANORAMA side view

Figure 10: Cut-Away Perspective

Figure 11: Plan view of collimation system showing image distance reduced to the driver's side and increasing distance towards the opposite side of the field

Figure: 12

Figure 13: Pre-distorted Image

Figure 14: Distorted Image

DISPLAY APPARATUS

This invention relates to display apparatus for the presentation of computer graphics or video images.

Display apparatus for aircraft flight simulators is well known. This display apparatus provides a technological base line from which similar display apparatus for more cost sensitive applications such as ground vehicle driving simulators could be built. The ground vehicle driving simulators may be, for example, car and truck simulators. However, the cost of commercial flight simulator display apparatus has in the past been prohibitive for all but the most specialised top range ground vehicle driving simulators. Contradicting this aspect however, is that the requirements for simulation of environments and situations for vehicles can be more demanding than for flight simulators.

Ground vehicle driving simulators fall into two simple categories, namely those used for training and those used for research. Ground vehicle driving simulators used for training are designed to impart some new skill to the driver. Examples could be for base vehicle operation, conversion between vehicle types, emergency services such as police pursuit, and post-injury rehabilitation. Ground vehicle driving simulators used for research may use the driver as part of an experiment or study. The experiment or study could be in vehicle design such for example as vehicle performance and aesthetics. The study could be a human factor study, for example studying the effects of drugs or ageing on drivers. The experiment could even be with regard to road planning, for example with regard to sign and signal design and placement, and road markings.

Generally, justification of manufacturing costs is quite different between training and research. For training, the balance of justification on cost effectiveness alone is very difficult, because today all training is performed successfully in real vehicles, and the cost of a simulator of sufficient fidelity would normally far exceed the cost of the vehicle it simulates. An exception is where the end user is not the general public but rather a specialist user such for example as police, fire or other emergency services, military vehicle users, and users of specialist equipment such as cranes and earth movers. In such cases, the vehicle can be expensive, training may be unacceptable in the real vehicle, and simulation is normally valued for the reason that the simulation can take place in varying environmental conditions such for example as in varying weather conditions and in dangerous situations.

Known display apparatus for ground vehicle driving simulators endeavours to provide a visual display which is known as an out-of-the-window display. There is always a quest for as large a field of view as possible, with as high a resolution as possible for the lowest possible manufacturing cost. With regard to resolution, there seems to be a wide range of opinion as to what is acceptable. One important factor is the visibility of a simulated sign, which with a display resolution of 6 arc-min/olp, would not be legible until it is much closer than the real sign would be. However to specify, for example 3 arc-min/olp everywhere would be cost prohibitive. One pragmatic solution taken has been to artificially magnify the size of signs, such that the signs are legible at the appropriate distances. This tends to give the sign an unnatural appearance. Progressively reducing the sign size to the correct value as it comes into range may help, but this can present a dynamic artifact that detracts from realism. Target projectors as used in some flight simulators could be used to display signs by overlaying or cutting into the main scene. However, the cost of such a solution is likely to be prohibitive and, unless the dynamic correlation is perfect, the signs would give the sensation of floating in the simulated world. Currently known out-of-the-window display solutions have been such that manufacturers of training simulators have built what they could afford, rather than what they would like to build. In doing so, important trade-offs have been related to the ability to complete the training objectives with the display selected. Car and truck simulators have been built with a wide range of different types of out-of-the-window display apparatus. For training usage, they have been mainly confined to four basic types, namely direct-view monitors, front-projected real-image, rear-projected real-image, and rear-projected tilted mirror collimators. Head mounted displays have recently also been used, although mainly in research application environments. These different types of display apparatus will now be considered.

Direct View Monitors

Direct-view monitors are such that graphic monitors are fitted directly on to the simulator cab, around the driver. Whilst this provides the most cost effective and compact type of display apparatus, the extremely short accommodation (or viewing) distance and large gaps between viewable channels do not really result in a high fidelity display. Such direct-view monitors have value where these aspects do not impact on the training requirement, and the relative restrictive cab environment fidelity can be tolerated. This is however not usually the case. Cab fidelity is usually required together with acceptable accommodation, and as continuous a visual field as possible.

Front-projected Real-Image Display Apparatus

Front-projected real-image display apparatus may provide a wrap around display by placing a curved screen around the simulator cab, and front projecting on to the curved screen using cathode ray tube projectors. The cathode ray tube projectors form their images from what is essentially a continuous scanning process, which gives the technology the distinguishing characteristic of "infinite addressability". What this amounts to in practice is that, through the introduction of terms in the electronic scanning sub-system of the projector, the projected image formed can be distorted in a continuous fashion. This ability is particularly useful when projecting on to curved screen surfaces and it has been a key factor in cathode ray tube projection remaining dominant in simulation display apparatus for more than twenty years. In such systems, the projectors must be placed within the screen volume, effectively sharing space with the rest of the simulator. Experience has found that this can be particularly difficult where the cab to be simulated is large and/or where there is a small room size. Various solutions can be made to work and so the benefits of front-projected cathode ray tube systems can be given as continuous image presentation, mature projection technology giving low risk and off-the-shelf availability, high performance digital electronic blending, and good dynamic image presentation. However, drawbacks include the fact that designs tend to be cab-specific and thus require a one-time design for each new simulator. Often the required field-of-view must be compromised, and the cab may require modification to eliminate shadowing.

Front-Projected Liquid Crystal Display Systems

General comparisons between liquid crystal display and cathode ray tube technologies have previously been made in the field of display apparatus for flight simulation. Liquid crystal display technologies are regarded as being particularly attractive, primarily due to the promise of reduced system maintenance, versatile lens options, and small physical size and weight for a given light output. Until recently, liquid crystal display front-projected display apparatus was not deemed to be acceptable to realise simulation displays of adequate performance. Recently however, improved performance of the projectors, along with new technologies of digital distortion correction and optical blending, have come together to offer a new capability option. This has only previously been recognized for flight simulation application, but it does apply equally to ground vehicle application.

Generally, the cathode ray tube front-projected layout can be replicated using liquid crystal display projectors. At system level, the increased light output now available can be traded to provide a higher image contrast performance, as long as image luminance is sufficient. Also, there is significant benefit from reduced maintenance costs. However, the layout problems are the same. There is a limit to how far off-axis the projectors can be placed, primarily through the wastage of displayable pixels.

Rear-Projected Flat Screen Display Apparatus

Whilst front projection display apparatus suffers a basic drawback of layout difficulty due to shadowing problems, rear projection appears completely to solve this problem. With rear projection, the projectors may be arranged outside the enclosed volume of the display screen. Hence the simulator cab space is not shared by the projectors, which themselves also radiate outwards from the centre of the display apparatus. Thus, no image occlusion occurs and large fields-of-view can relatively easily be achieved, even around large awkwardly shaped truck and bus cabs. An added advantage is that, with proper selection of screen material, overall contrast from the display apparatus can approach that of the basic projector, perhaps giving 25:1 compared to 15:1 for comparable front projection display apparatus.

However, rear projection is not without its drawbacks. Firstly, multiple flat rear projection screen sections are generally used to make up the total field-of-view in a piece by piece fashion. This results in a varying accommodation distance for the observer. Screen joins always represent a discontinuity both because of this segmentation and, more importantly, from the effects of screen gain. Rear projection screens do not diffuse the light as evenly as matt-painted front-projection screens, but instead exhibit a preferential transmittance along the axis of the incident light. The on-axis rays, from the projector through the eye, will be transmitted to the maximum nominal gain of the screen, which is typically around 1.5. The gain represents the luminance that would be achieved referenced to 100% matt white reflected surface, so that a figure of 1.5 would result in a relative luminance of 150%. The rays at the edges of the field-of-view are significantly away from this axis, and the gain lobe shape can illustrate the fraction of light returning to the eye. This manifests itself in the form of large image non-uniformity. If, for example, a single projector were to illuminate a screen section covering 60° horizontal by 40° vertical, the corner luminance would only provide around 25% of the centre luminance when viewed at the design eye-point. However, the human eye can be surprisingly tolerant to such variations, and rear projected systems of this type can be acceptable for simulation.

It is to be noted that use on a dynamic motion platform is difficult, owing to the large flat screen sections. Cylindrical screens could be used to provide a continuous image surface and the inherently improved self-supporting geometry results in a display screen that is more motion compatible. However, the gain lobe effects are further exaggerated horizontally, limiting individual channel fields of view.

Rear-projected systems are therefore very useful in providing large field-of-view out-of-the-window displays, but they have performance limitations which must be taken into account.

Collimated Projection Display Apparatus

Tilted-mirror collimators have long been established as the mainstay of wide-bodied aircraft simulators but, until recently, they have not been widely used for ground vehicle driving simulators. This is largely because of cost. The primary components of tilted-mirror collimators are as follows:

1. A projection system, typically cathode ray tube based, cross firing above the simulated cab or cockpit.
2. A rear projection screen, typically spherical, placed above and in front of the cab. The projectors form an image on the outer surface of this screen.
3. A collimating mirror, in front of the cab, wrapping around for a large horizontal field-of-view. The most cost effective and common arrangement here is to stretch a polyester film coated in an aluminium reflective surface, over the edges of an evacuated mirror cell. The rear projected image is viewed via this curved mirror.

The relationship between the curvatures of the mirror and the rear projection screen is designed to set the image distance at a much greater value than that of the physical mirror radius, for example 3 meters typically. The image distance is set to a nominal value of 20–30 meters which significantly enhances the subject realism of the scene. This also has great benefit in flight simulation since the pilot and co-pilot are then simultaneously able to perceive correct image geometry for distant objects. However, for a road vehicle simulator, such collimation may actually be a disadvantage. This is because the simulated environment often presents objects that are quite close to the driver, for example when adjacent to another vehicle. If displayed at an image distance of 20 meters, the relative size cues to the driver would be incorrect, especially with head movement.

The main cost components in this type of display are as follows.

1. The projection system which typically uses expensive cathode ray tube projectors, with high quality digital blending.
2. The rear projection system, which requires specialist tooling for the large spherical form factors and precision coating technology.
3. The projector support structures over the cab, which tend to be simulator specific so that standard designs cannot easily be used.
4. To a lesser extent the mirror cell.

Savings may be obtained by use of liquid crystal display projectors or other fixed matrix projectors, which would reduce the cost of supporting structures. Generally, however, other than for specific top range or high volume applications, it may be difficult to justify the cost of this class of display apparatus.

Head Mounted Display Apparatus

Head mounted display apparatus is finding application in a number of simulation research applications. A generic driver cockpit would allow for re-configuration between vehicle types. Also, a very low total load on the motion base would enable simulation of any ground vehicles with a low cost motion system. Further, a head mounted display allows the driver to look in any direction without limitation from the display device. Such a combination of features is difficult if not impossible to achieve with projected out-of-the-window displays. However, there are two fundamental reasons why head mounted display apparatus has not been widely accepted for ground vehicle driving simulators. The first reason is that in the real world, drivers do not need to wear headgear. The second reason is that the visual performance of head mounted display apparatus to date has not been adequate, especially with regard to transport delay, compensation for head movement, and field-of-view. Furthermore, optical limitations (for example resulting in eye strain or sickness) and discomfort (for example weight, centre of gravity and hygiene) are significant problems.

It is an aim of the present invention to reduce the above mentioned problems.

The present invention provides a method of producing display apparatus, which method comprises providing an enclosed display volume, providing a curved projection screen for being viewed within the enclosed display volume, providing at least one projector for providing an image on the screen, positioning the said at least one projector outside the enclosed display volume, providing a curved collimating mirror within the enclosed display volume and via which the image is viewed, causing the screen to be of such a shape and/or position that portions of the screen vary in distance from the curved collimating mirror whereby image distance is not constant across the total field-of-view of the display apparatus, and maintaining the shape and/or position of the screen whereby during use the display apparatus has an apparent image distance which, when viewed via the collimating mirror, appears to vary within the total field-of-view of the display apparatus without a user of the display apparatus having to move relative to the screen.

The display apparatus of the present invention may be for simulators such for example as flight simulators and ground vehicle driving simulators. The display apparatus may be used for other simulators if desired. The display apparatus may also be used in non-simulator applications so that the display apparatus may be for visualisation and virtual reality systems where similar display characteristics would be of benefit.

The display apparatus of the present invention may enable ground vehicle driving simulators to be produced with the following advantages.
1. Low cost.
2. Close image distance on the driver's side.
3. Longer image distance elsewhere.
4. Continuous image of high contrast and luminance.
5. Low maintenance.
6. Light weight.
7. Re-use of the design to eliminate one time costs in the simulator structures.
8. Flexibility to change simulator cabs.

The display apparatus of the present invention may be used to provide a highly integrated motion and display platform with well defined interfaces. This may enable, with little or no specific interface design, a simulator cab to be built into an off-the-shelf platform, in an accelerated time frame and at minimised cost.

The display apparatus may be one in which the screen is of a shape and/or position that gives a short image distance on the driver's side, and in which this distance increases in straight-ahead and in curb-side directions. The shape of the screen may be spherical, with a relative offset to an axis of the front projection surface being shifted to reduce the image distance on the driver's side. Alternatively, the shape of the screen may be a complex aspheric shape. Simple shapes like cylinders may also be utilised, although the variation in image distance will be more extreme, especially in the vertical direction.

The projectors are preferably fixed matrix projectors. Examples of fixed matrix projectors are liquid crystal display projectors and digital micromirror device projectors.

The display apparatus may be one in which the projectors are such that they are in groups, with each group having at least two of the projectors. Thus, instead of a single projector at each appropriate location, two or more of the projectors may be stacked, with the spacing between projector locations being reduced. For example, the display apparatus may then comprise twelve of the projectors, in pairs, covering 180°×45° to give a basic display resolution of approximately 2.7 arc-min/olp from 1280×1024 projectors. Low cost personal computer image generator channels may then provide the content. Alternatively, a smaller number of image generator channels in combination with a pixel sharing system may be used.

If desired, the projectors may be arranged radially outside the screen.

The display apparatus of the present invention may include image generator means for generating images to be displayed on the screen.

The display apparatus may include digital distortion correction means for removing distortion introduced by the optical configuration. The digital distortion correction means may be such that it applies a bi-linear or other digital re-mapping function to the image.

Preferably, the digital distortion correction means is positioned between the image generator and the projectors.

The display apparatus of the present invention may include optical blending means for optically blending overlapping images from the projectors.

The present invention also provides a simulator, a visualisation system or a virtual reality system, when including the display apparatus of the invention.

Embodiments of the invention will now be described solely by way of example and with reference to the accompanying drawings in which:

FIG. 12 shows apparatus for digital distortion correction;

Figure 1:
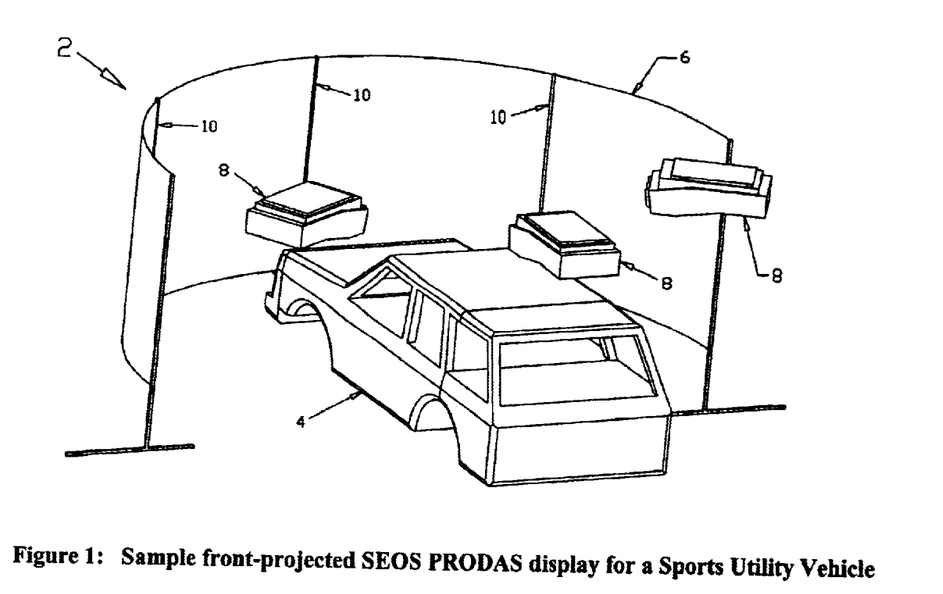
FIG. 1 shows a known front-projected real image display apparatus for a sports utility vehicle.

Referring to FIG. 1, there is shown a ground vehicle driving simulator 2 comprising part of a sports utility vehicle 4 positioned on the front side of a curved screen 6. The apparatus shown in FIG. 1 provides a wrap around display by positioning the screen 6 around the vehicle 4 as shown, Front projecting on to the screen 6 is effected by cathode ray tube projectors 8. The cathode ray tube projectors 8 form their images from what is essentially a continuous scanning process, which gives the technology the distinguishing characteristic of being infinitely addressable. The projected images formed can be distorted in a continuous fashion and this ability is particularly useful when projecting on to curved screen surfaces such as the surface of the screen 6. In the apparatus shown in FIG. 1, the projectors 8 must be placed within or closely above the enclosed screen volume, effectively "sharing" the space with the rest of the simulator. This can be especially difficult when the cab to be simulated is large and/or there is a constrained room size.

In FIG. 1, the screen 6 is part of a continuous cylinder. The joins are simply the supports 10 for the screen 6. The projectors 8 are cathode ray tube projectors which cross fire above the axis of the driver's eye point. One of the objectives of the apparatus as shown in FIG. 1 is to use a cab in the vehicle 4 with the absolute minimum modification to its structure. This enables a wide range of vehicles to be simulated.

Figure 2:
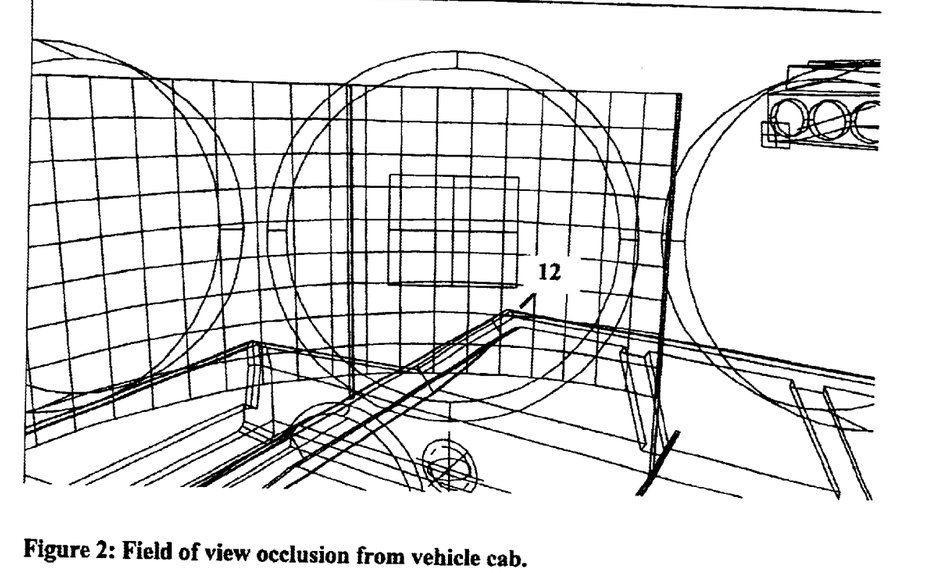
FIG. 2 illustrates field-of-view occlusion from the vehicle cab shown in FIG. 1.

FIG. 2 illustrates the type of problem experienced from the apparatus layout shown in FIG. 1 where the extremes of the cab occlude the projected light path to the screen 6. FIG. 2 shows somewhat schematically looking out from the central lens of the left hand projector 8 through to the screen 6 on to which is superimposed an azimuth/elevation grid. The top corner of the vehicle cab can be seen to shadow a region 12 in the lower right extremes of the image. The layout shown in FIG. 1 has been tuned to keep this region 12 outside the visible view of the driver, but it could be that for a larger cab, the problem becomes more difficult as shown in FIG. 3.

Figure 3:
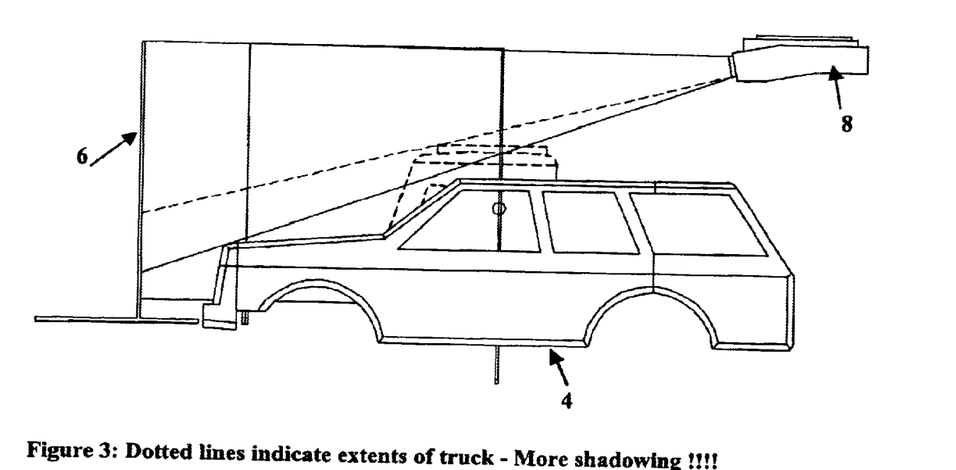
FIG. 3 illustrates by means of dotted lines the extent of a truck cab giving shadowing.

Referring to FIG. 3, the projectors 8 could be raised further to allow for larger cabs. However, in doing so, projector geometric pre-distortion must be increased, projector structures become larger, and, especially for implementation on a motion system, significant cost starts to accumulate in the design realization.

Figure 4:
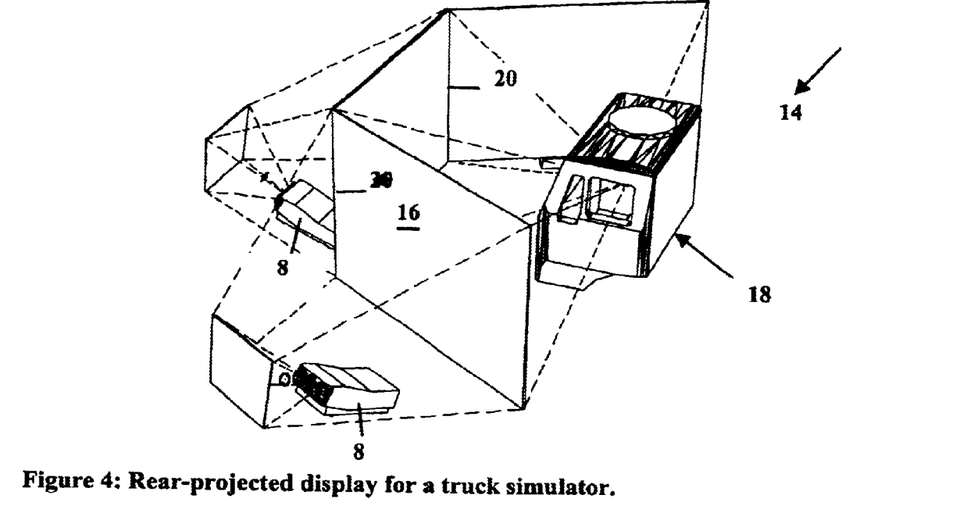
FIG. 4 shows known rear-projected display apparatus for a truck simulator.

FIG. 4 shows known rear-projected flat screen display apparatus 14 utilising rear projection. The rear projection appears to solve completely the above mentioned problem with front projection. As can be seen from FIG. 4, projectors 8 are arranged outside the enclosed volume of a display screen 16. A simulator cab 18 is positioned in the front of the screen 16 as shown. The simulator cab space is not shared by the projectors 8, and the projectors 8 themselves radiate outwards from the centre of the display apparatus 14. Thus no image occultation occurs and large fields-of-view can relatively easily be realised, even around large awkwardly shaped truck and bus cabs.

Figure 5:
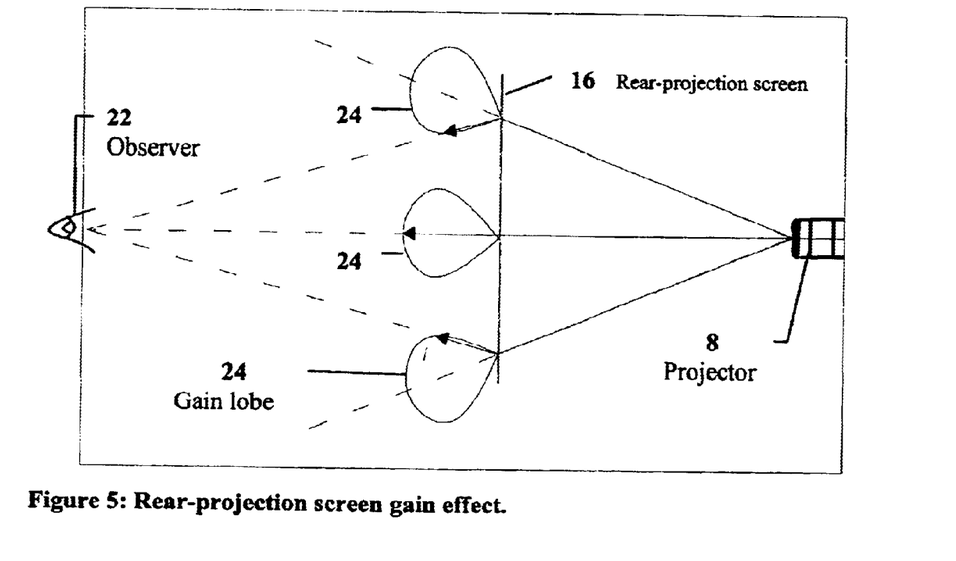
FIG. 5 shows a rear projection screen gain effect.
Figure 6:
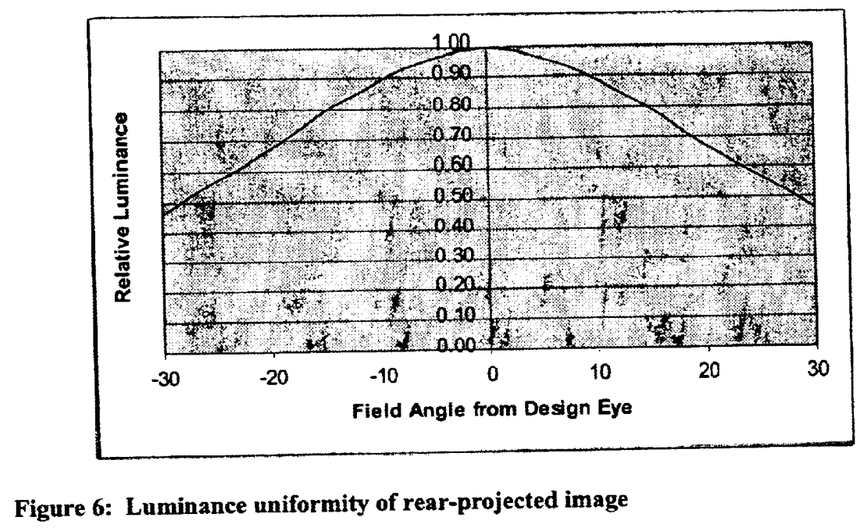
FIG. 6 illustrates luminance uniformity of a rear-projected image.

The display apparatus 14 shown in FIG. 5 is such that multiple flat rear-projection screen sections are used to make up the screen 16, and thus the total field-of-view is made up in a piece by piece fashion. This results in a varying accommodation distance for the observer. Screen joins 20 always represent a discontinuity, both because of the segmentation and more importantly from the effects of screen gain. The rear projection screen 16 does not diffuse the light as evenly as a matt painted front projection screen, but instead exhibits a preferential distribution along the axis of incident light as shown in FIG. 5. The on-axis rays from the projector 8 through to the eye 22 are transmitted to the maximum nominal gain of the screen 16, which is typically around 1.5. The rays at the edges of the field-of-view are significantly away from this axis, and the shape of the gain lobes 24 as shown in FIG. 5 illustrate the fraction of light returning to the eye. This manifests itself in the form of large image non-uniformity as shown in FIG. 6.

Figure 7:
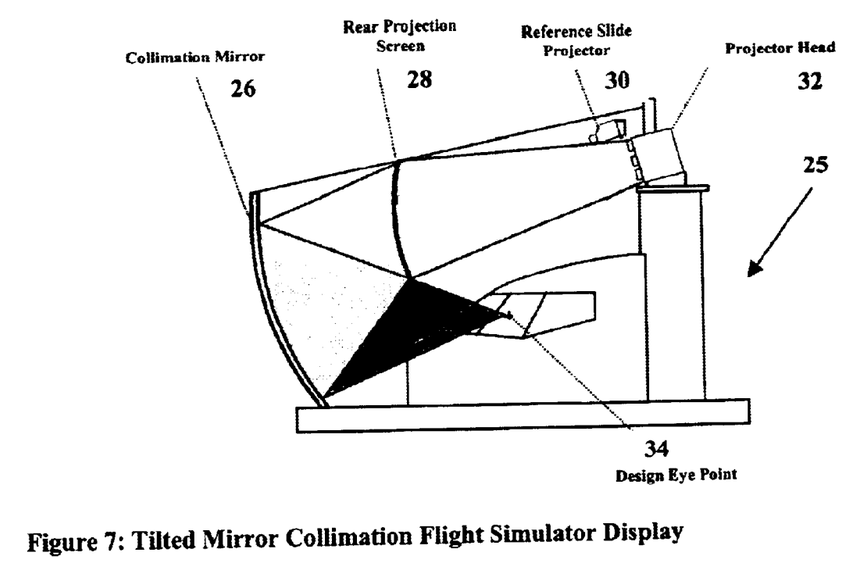
FIG. 7 shows a known tilted mirror collimation flight simulator display.

FIG. 7 shows known collimated projection display apparatus utilising a collimation mirror 26, a rear projection screen 28, a reference slide projector 30, and a projector head 32. A design eye point 34 is positioned as shown.

The tilted mirror collimator display apparatus 25 shown in FIG. 7 is used in flight simulators. For a road vehicle simulator, the use of the collimation mirror 26 and its collimation may become a disadvantage. This is because the simulated environment often presents objects that are quite close to the driver, for example when adjacent to another vehicle. If displayed at an image distance of 20 meters, the relative size cues to the driver would be incorrect, especially with head movement. In addition, the display apparatus 25 shown in FIG. 2 is relatively expensive to manufacture, which may be acceptable for flight simulation but which is usually prohibitive in road vehicle simulators where cost considerations are of more importance.

Figure 8:
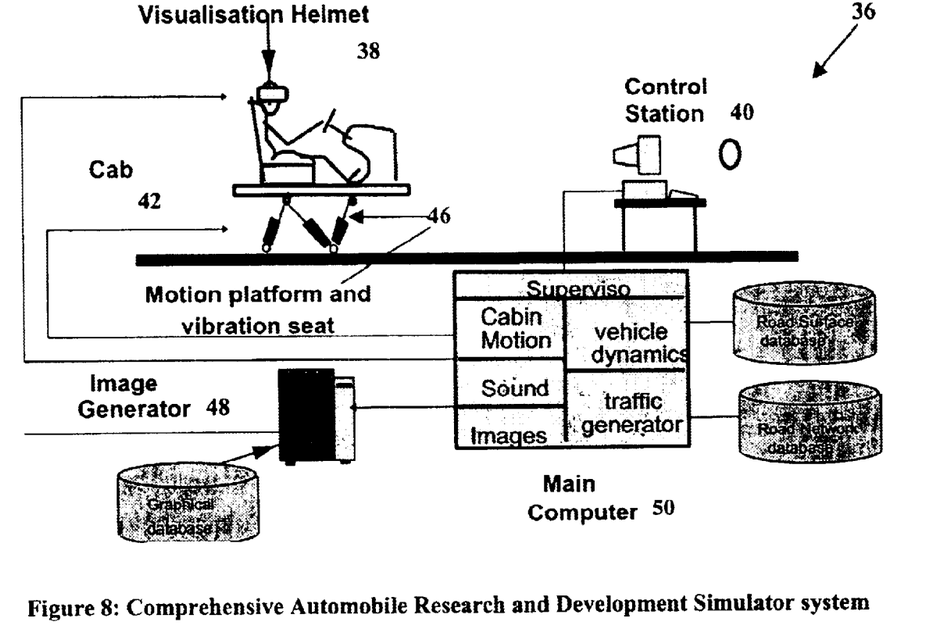
FIG. 8 shows a known ground vehicle research and development simulator utilising a head mounted display.

FIG. 8 shows known ground vehicle research simulator apparatus 36 utilising a head mounted display visualization helmet 38, a control station 40, a cab 42, and a motion platform 46. The simulator apparatus 36 also includes an image generator 48 and a main computer 50. The intention of the simulator apparatus 36 is to provide a near 100% synthetic environment through the use of fully immersive head mounted display visualization. The cab 42 may be a generic cab allowing for re-configuration for different vehicle types. There is a very low total load on the motion platform 46 which enables simulation of ground vehicles with a low cost motion system. The head mounted display allows the driver to look in any direction without any limitation from the display device. The head mounted display apparatus 38 is however such that it has not been widely accepted for training for two reasons. Firstly, in the real world, drivers do not need to wear head gear. Secondly, visual performance of head mounted display based systems is not adequate, especially with regard to transport delay, compensation for head movement, and field-of-view. Furthermore, optical limitations may result in eye strain and sickness. Discomfort such as weight, centre of gravity and hygiene due to wearing the head mounted display may also be a problem.

Figure 9:
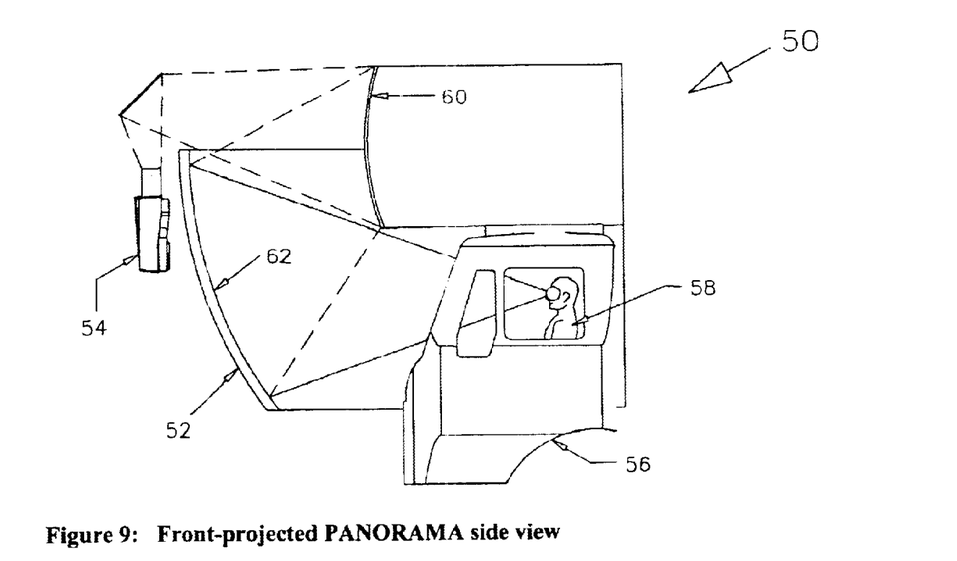
FIG. 9 shows display apparatus of the present invention.
Figure 10:
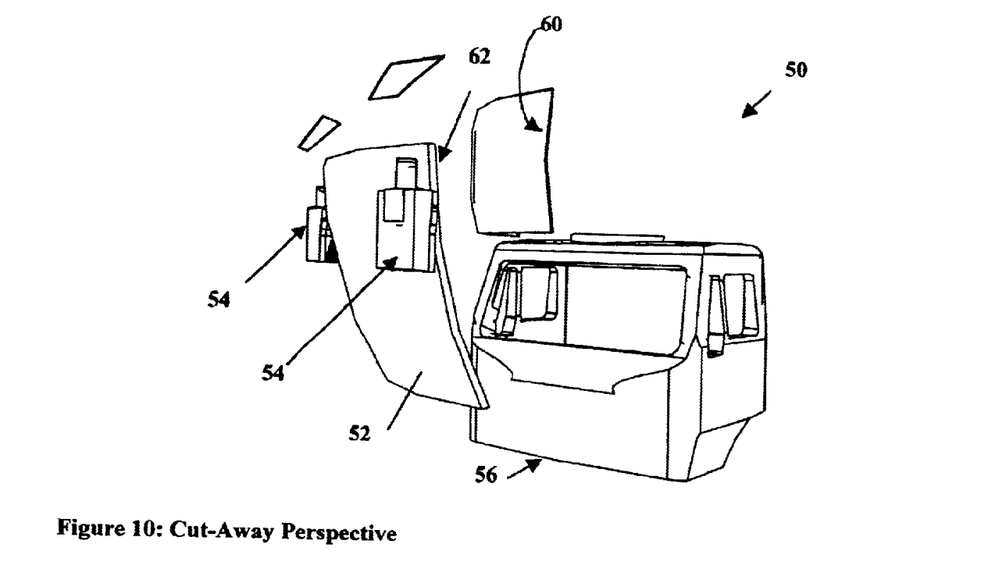
FIG. 10 is a cut-away perspective of a driver's cab used in the display apparatus and vehicle simulator shown in FIG. 9.

Referring now to FIGS. 9 and 10, there is shown display apparatus 50 of the present invention. The display apparatus 50 comprises a curved front projection display screen 60, a plurality of projectors 54, and a collimating mirror 62 which is formed from aluminised polyester film drawn to a partial vacuum using a chamber 52. One projector 54 is shown in FIG. 9 for simplicity of illustration. Two projectors 54 are shown in FIG. 10. Also shown in FIGS. 9 and 10 is a cab 56. FIG. 9 shows a driver 58 in the cab 56. The projectors 54 are for providing a display on the screen 60 which is of the front projection type in that an Image is reflected from the same surface on to which it is projected. As can be seen, the projectors 54 are positioned behind the mirror chamber 52. The front projection display screen 60 is utilised for receiving images from the projectors 54 as shown. The image formed on the front projection display screen 60 is viewed by the driver 58 via the collimating mirror 62, thus setting the apparent image distance at some value greater than the radius of the collimating mirror 62.

The projectors 54 are arranged outside the mirror chamber 52 and they fire radially inboard on to the front projection surface of the screen 60. The screen 60 can be produced at significantly less expense than the screen 28 shown in FIG. 7. The projectors 54 can be liquid crystal display projectors or other low maintenance fixed matrix projectors.

The display apparatus 50 may present three problems in itself, these being as follows.

1. Focus

The reverse screen curvature is not the intended application for off-the-shelf lenses to be found on projectors. However, high F-number optics characteristic of fixed matrix projectors and appropriate techniques can be utilised to overcome this problem at low cost.

2. Distortion

The reverse screen curvature creates a problem in that it tends to form primarily pin cushion and trapezoidal distortion to the projected channel images. Distortion correction means may be employed to eliminate this problem. The distortion means may apply a bi-linear or other digital re-mapping function to the image.

3. Edge Blending

An optical blending system is required which provides a fully seamless multi-channel image across the field of view. Such an optical blending system can be provided.

It can be appreciated from the above that the display apparatus shown in FIGS. 9 and 10 is a novel display apparatus that exhibits all of the key characteristics required and mentioned above in connection with the known display apparatus. Thus the display apparatus 50 is able to utilise the following techniques and features.

1. A front projection layout which places the projectors 54 outside the enclosed display volume. This releases a large open space into which a wide variety of simulated cab types may be introduced. The only special interfacing required would be to ensure that the design eye height is correct so that, if the basic layout was to allow for the largest cab, then everything from a small car cab to a much larger cab could be introduced. An added benefit is that the projection system could be entirely maintained from the outside of the main simulator.

2. Special Screen Shape

Figure 11:
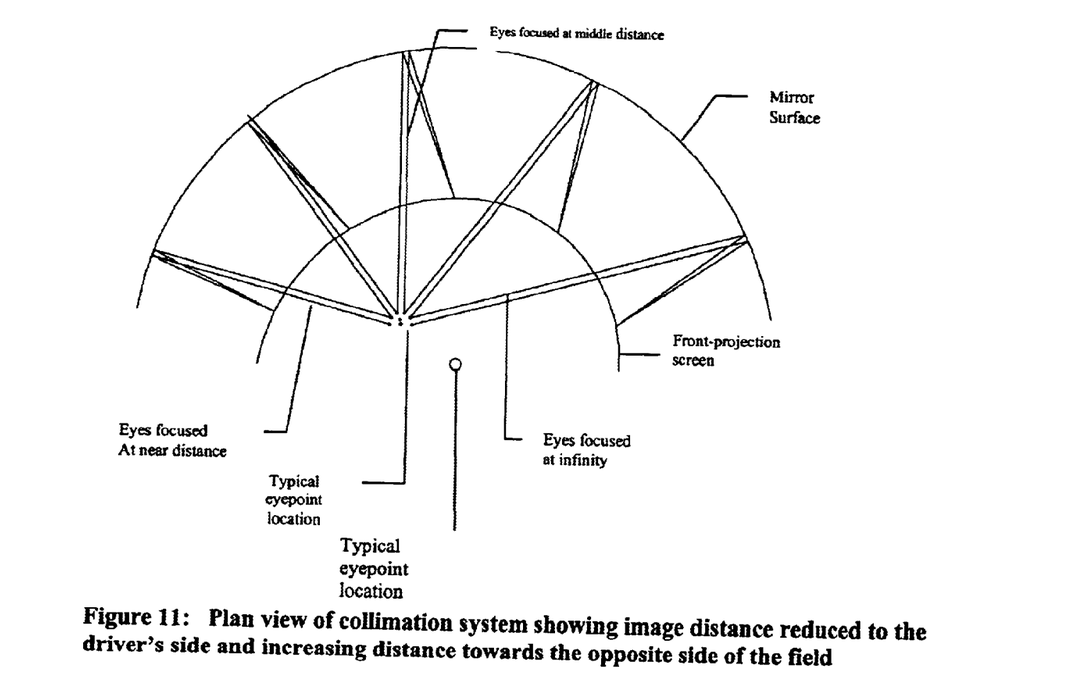
FIG. 11 is a plan view of a collimation system showing image distance reduced to the driver's side and increasing image distance towards the opposite side of the field.

The screen 60 is not required to be constrained by specialist manufacturing techniques normally required for transluscent rear-projection screens. The front projection screen 60 can be made from low cost materials and it may be made in any suitable and appropriate shape. As mentioned above, the image distance in a tilted collimator is dictated by the relationship between the screen and mirror curvatures. Therefore, if the shape and/or position of the screen 60 is appropriately adapted, it is possible to design for a short image distance on the driver's side, and to have this distance increase in the straight ahead and kurb-side directions. FIG. 11 illustrates this principle where the screen shape has been adapted to give this effect. There are many shapes that could be chosen, from spherical (where the relative offset to the mirror axis is shifted to reduce the image distance on the driver's side) to a complex aspheric shape. Simple shapes like cylinders may also be acceptable, although the variation in image distance will be more extreme, especially in the vertical direction.

3. Liquid crystal display projectors or other fixed matrix projectors may be used. These projectors are light in weight and they are optically stable. Also, the relatively high f-number of the optics allows a far greater flexibility in optical design to solve the focus problems.

4. For additional resolution, the ability to readily stack small fixed-matrix projectors can be exploited to give very high resolution. Instead of a single projector at each location as shown in FIGS. 9 and 10, two or more of the projectors could be stacked, whilst the spacing between locations could be reduced. An example system would then comprise twelve projectors, in pairs, covering 180°×45° to give a basic display resolution of approximately 2.7 arc-min/olp from 1280×1024 projectors. Alternatively, the projectors could be radially arranged around the screen, providing the layout permits. Low cost personal computer image generator channels may then provide the content, or alternatively a smaller number of image generator channels in combination with a pixel sharing system may be used.

5. The display apparatus of the present invention may utilise a digital distortion correction means. This may be introduced between the image generator source and the projectors. The digital distortion correction means may enable the removal of the above mentioned pin cushion distortion. Such pin cushion distortion correction could be performed within the image generator, but cost and/or additional transport delay would be incurred.

6. Optical blending may be achieved to ensure that adjacent overlap channels are fully blended, including the residual black-level component that cannot be modulated within the video path.

The display apparatus of the present invention may utilise five display channels to provide sufficient resolution. Special arrangements may be possible to provide super-high resolution with larger channel counts. Personal computers may be utilised as the image generators since the cost of personal computers is small. Thus providing additional channels does not increase substantially the cost. Importantly, by standardising on a single design and exploiting low cost components, the display apparatus may provide virtually all the above indicated desirable attributes at an affordable cost.

Referring now to FIG. 12, there is shown schematically an image generator 64, digital distortion correction means 66, and projectors 68. Multiple undistorted video images are indicated by arrow 70. Multiple distorted video images are indicated by arrow 72.

The digital distortion correction means 66 may be designed to correctly change the geometry of a video image in order to map that image on to a curved screen so that the image appears correctly shaped. Traditionally, the mapping from rectangular image to curved screen has been implemented in cathode ray tube projectors which have the ability to "bend" the picture using magnetic fields acting on the electron beam. Other technologies such as liquid crystal display and DMD technologies have become much more popular but the image is physically a rectangle and is hence unable to be shaped to match the curved screen. In order to do this, the image itself can be re-distorted.

The digital distortion correction means 66 takes in the undistorted image from an image source, distorts that image according to a predefined algorithm, and the image is then sent to the projector 68. The distortion algorithm is configurable, taking in such data as projector position, eye point position, and producing a near approximation to the ideal distortion. This can then be interactively tuned to take care of any non-predictable distortions.

Figure 13:
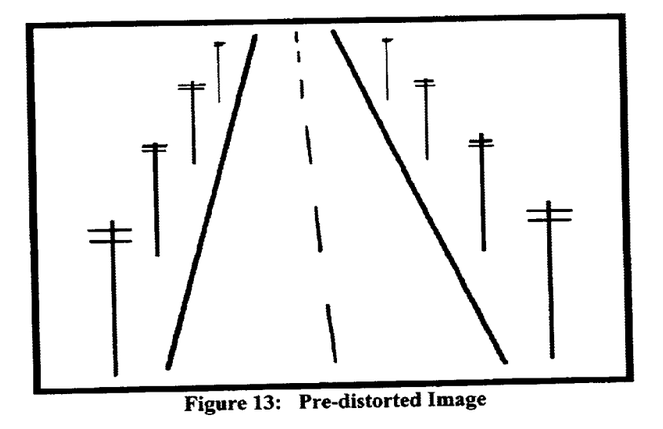
FIG. 13 shows a predistorted image.
Figure 14:
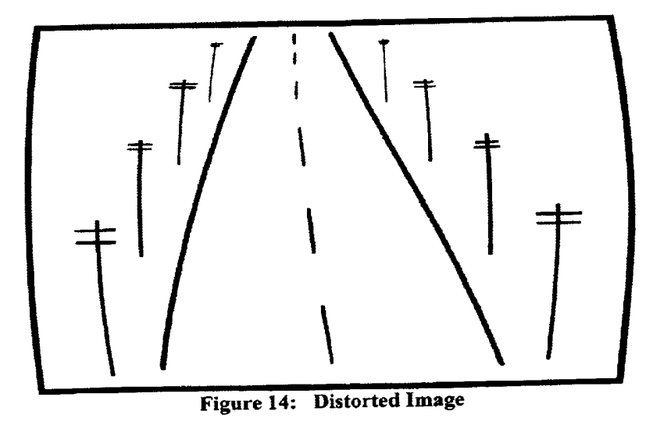
FIG. 14 shows a distorted image.

A predistorted image is shown in FIG. 13, and a distorted image is shown in FIG. 14.

It is to be appreciated that the embodiments of the invention described above with reference to FIGS. 9–14 have been given by way of example only and that modifications may be effected. Thus, for example, different shaped display screens may be employed to those shown. The display apparatus of the invention may alternately use a fixed format projection device such for example as a scanned laser projector. The collimating mirror construction may also be of the solid type, instead of vacuum-formed on to a chamber. Finally, a display system embodiment of the invention may use a single projector.

I claim:

1. A method of producing display apparatus, which method comprises providing an enclosed display volume, providing a curved projection screen for being viewed within the enclosed display volume, providing at least one projector for providing an image on the screen, positioning the said at least one projector outside the enclosed display volume, providing a curved collimating mirror within the enclosed display volume and via which the image is viewed, causing the screen to be of such a shape and/or position that portions of the screen vary in distance from the curved collimating mirror whereby image distance is not constant across the total field-of-view of the display apparatus, and maintaining the shape and/or position of the screen whereby during use the display apparatus has an apparent image distance which, when viewed via the collimating mirror, appears to vary within the total field-of-view of the display apparatus without a user of the display apparatus having to move relative to the screen.

2. A method according to claim 1 and including providing a cab for a person using the display apparatus, and in which the screen is varied in shape and/or position such as to give a short image distance on a side of the display apparatus to be occupied by the person, and to cause this distance to increase in straight-ahead and in curb-side directions.

3. A method according to claim 2 in which the screen is caused to be spherical, with a relative offset to an axis of a front surface of the screen being shifted to reduced the image distance on the side of the display apparatus to be occupied by the person.

4. A method according to claim 2 in which the screen is caused to be of a complex aspheric shape.

5. A method according to claim 1 in which the projectors are fixed matrix projectors.

6. A method according to claim 1 in which the projectors are provided in groups, with each group having at least two of the projectors.

7. A method according to claim 6 in which the projectors are arranged radially outside the screen.

8. A method according to claim 1 and including providing image generator means for generating images to be displayed on the screen.

9. A method according to claim 8 and including providing digital distortion correction means for removing distortion.

10. A method according to claim 9 in which the digital distortion correction means is positioned between the image generator means and the said at least one projector.

11. A method according to claim 1 and including optical blending means for optically blending overlapping images from the said at least one projector.

* * * * *